United States Patent [19]

Reitz

[11] Patent Number: 5,018,912
[45] Date of Patent: May 28, 1991

[54] DRILLING JIG FOR STAIR RAILS

[75] Inventor: George J. Reitz, Feasterville, Pa.

[73] Assignee: By George Enterprises, Inc., Pleasant Valley, Pa.

[21] Appl. No.: 526,518

[22] Filed: May 18, 1990

[51] Int. Cl.$^5$ ............................................. B23B 45/14
[52] U.S. Cl. .................... 408/115 R; 144/106; 408/88; 408/72 B; 408/97; 408/103
[58] Field of Search ............... 408/72 R, 72 B, 115 R, 408/115 B, 87–89, 97, 103, 110–112; 33/628, 636, 638, 640–642; 144/104, 106

[56] References Cited

U.S. PATENT DOCUMENTS

| | | | |
|---|---|---|---|
| 3,626,513 | 12/1971 | Pytlak | 408/97 X |
| 3,807,889 | 4/1974 | Kiezel | 408/108 |
| 4,752,162 | 6/1988 | Groh | 408/72 R |
| 4,793,747 | 12/1988 | Reitz | 408/72 R X |
| 4,865,496 | 9/1989 | Challis | 408/72 R X |

*Primary Examiner*—Steven C. Bishop
*Attorney, Agent, or Firm*—Charles H. Lindrooth

[57] ABSTRACT

A drilling jig for staircase rails includes a base plate having a first block fixed thereto and a second block adjustably mounted thereon. Rotatably adjustable drill guides with bushings are provided on the first and second blocks to permit adjustment of the guides to a predetermined angle to the base plate. A demountable section of the base plate can be removed to permit drilling of a rail at a point close to an obstruction, such as a knule post. A third block is adjustably disposed on said demountable base plate section and include an adjustable aligning pin guide. The jig is preferably part of a kit which includes a set of drill bits of various sizes, each bit having an elongated shank of the same diameter adapted to fit the bushings of the drill guides. The jig kit further includes a set of aligning pins sized to match the drill bits, the pins having a common shank size to fit the third block aligning pin guide. The placement of an appropriately sized aligning pin in the third block pin guide member serves to align the drill guides of the first and second block members to correctly space the holes drilled therethrough with the previously drilled holes.

7 Claims, 4 Drawing Sheets

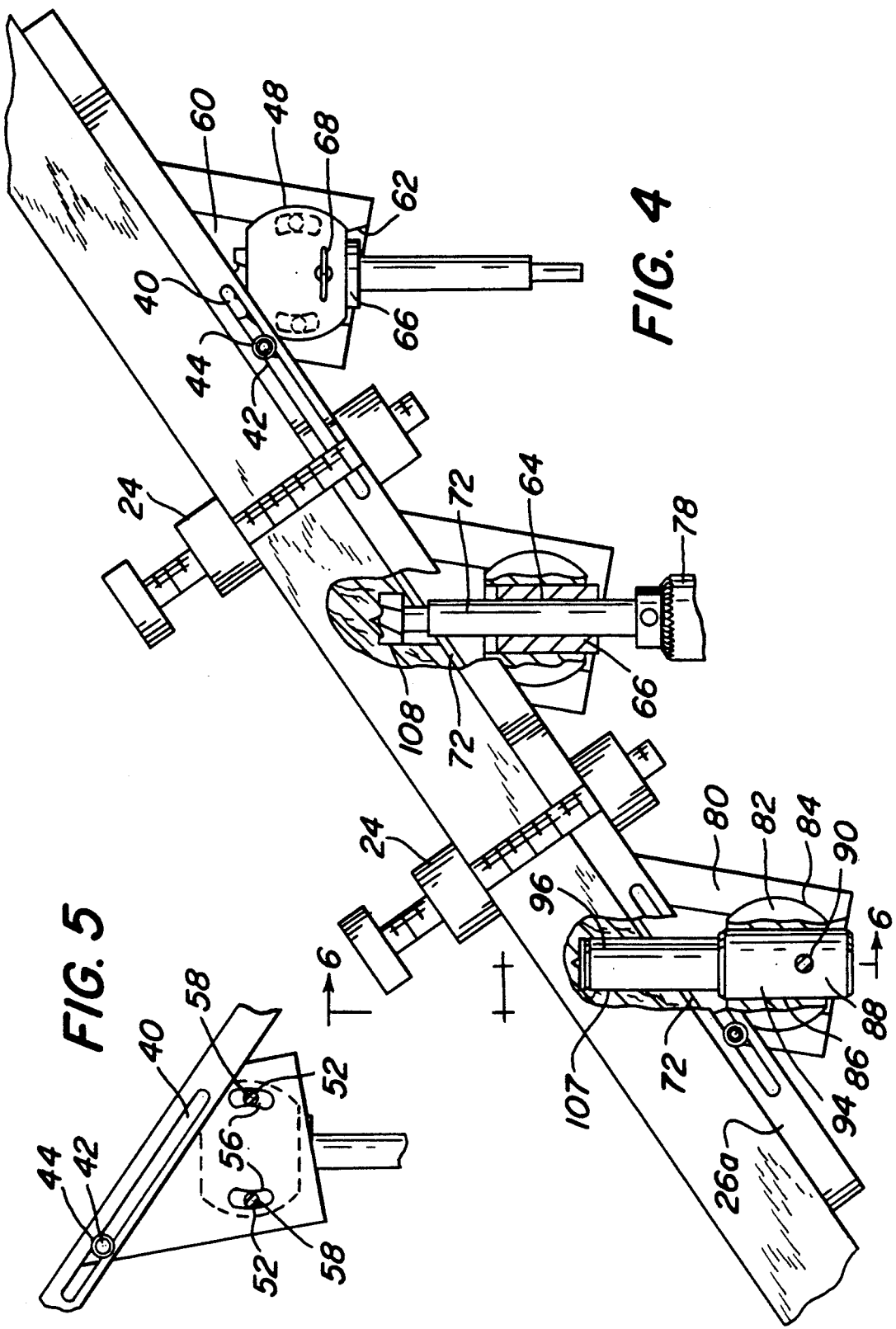

DRILLING JIG FOR STAIR RAILS

BACKGROUND OF THE INVENTION

1. Field of the Invention

The present invention relates generally to devices for guiding drill bits at a predetermined location and angle to a work piece for drilling holes therein, and relates more particularly to a drilling jig for stair rails for drilling the spindle holes in the underside thereof at the correct location and angle.

2. Background of the Invention

The installation of stair rails is an intricate and time consuming process which normally requires the skills of an experienced finish carpenter. Although the rail, supporting spindles and end posts are conventionally fabricated away from the construction site, the spindle holes in the underside of the rail must be drilled at the construction site to ensure the perpendicularity of the spindles. It is, in fact, usually necessary to install the rail in position with the lower end mounted on the knule post and the upper end supported either by a wall bracket or post as called for by the particular installation before the spindle hole positions and angles can be established.

By locating the exact position for the lower ends of the spindles on the stairs, the proper location for the spindle holes in the underside of the rail can then be determined. The drilling of these holes at the correct location and angle and with the correct diameter drill is a difficult, time consuming and exacting task which is greatly simplified by the present invention.

In the typical staircase, there are two spindles for each step, although occasionally three, and rarely four spindles may be based on each step. The upper ends of the spindles are tapered, and since the exposed lengths of the spindles on each step will differ due to the inclination of the stair rail, the holes to be drilled in the stair rail above each step will be of different diameters corresponding to the diameter of the tapered portion of each spindle at its intersection with the lower rail surface.

In my U.S. Pat. No. 4,793,747, issued Dec. 27, 1988, a stair spindle jig is disclosed which simplifies the drilling of stair rail spindle holes. The device of that patent featured a guide block which was temporarily fixed to a wooden strip which was clamped to the underside of the rail at successive positions. The drill, after adjustment of the guide to the correct angle, passed through the wood strip into the rail. The wood strip was discarded and replaced for each rail, extending the amount of time required to set up the jig for each job. Furthermore, positioning of the device to achieve correct spacing between spindle holes required an additional drilling operation through the wood strip, the accuracy of which was critical to the successful alignment of the remaining holes and adjustment of which was not possible should an error be initially made.

A further disadvantage of my earlier patented device was the need for drill guides comparable in diameter to the drills being employed. In addition, the drill guides were subject to wear due to the direct impingement of the drill cutting edges against the guides, leading to a short guide life.

SUMMARY OF THE INVENTION

The present invention is an improvement on my earlier patented stair rail spindle hole jig and comprises a base plate having a planar surface for engagement with the underside of a stair rail. A first block is fixedly mounted to the base plate and a second block is moveably mounted on the plate with means being provided to lock the second block in a predetermined spacing from the first block. Both the first and second blocks include drill guide means thereon including a selectively adjustable cylindrical drill guide member which is selectively rotatably adjustable within a cylindrical cavity of the block. Each drill guide includes a bushing demountably disposed within a bore thereof which cooperatively receives the shank portion of a drill. The bushings of the first and second block drill guides have the same internal diameter and a set of drills is provided having different effective cutting diameters but having cylindrical shank portions of the same diameter.

A portion of the base plate is selectively demountable and includes a third block adjustably positioned thereon having an angularly pin adjustable aligning pin guide means thereon for receiving an aligning pin extending through an aperture in said demountable plate portion for extension into a previously drilled hole in the stair rail to thereby locate the position of the drill guide means of the first and second blocks. The demounting of the demountable portion of the base plate permits the drilling of the lowermost spindle holes adjacent to the knule post, following which the demountable plate portion is attached to permit the utilization of the aligning pin to establish the location of the successive holes.

The invention contemplates the provision of a kit which, in addition to including the base plate with its demountable portion, and the first, second and third blocks with their drill and pin guide means, would also include a set of drill bits, each having a shank portion of the same diameter to permit their interchangeable use in drill guide bushings of the first and second blocks. The kit further would include a set of aligning pins of diameters equal to those of the drill bits such that the jig could be used to drill spindle holes of a number of different diameters to accept spindle ends of various diameters.

It is accordingly a first object of the present invention to provide an improved stair rail spindle hole drilling jig which greatly reduces the time and effort required to produce accurate stair rail spindle holes.

A further object of the invention is to provide a stair rail jig as described, the hole spacing and angles of which can be readily adjusted.

Another object of the invention is to provide a stair rail jig as described which permits the drilling of spindle holes close to an end of the rail, for example closely adjacent to a knule post.

Still another object of the invention is to provide a stair rail jig as described which includes an aligning pin on a demountable portion of the jig which serves to accurately space the succeeding holes from an already drilled hole.

A still further object of the invention is to provide a kit including the described stair rail drilling jig, which kit includes a series of drills of various sizes adapted for interchangeable use with the present jig along with a series of aligning pins matched to the drill sizes, the set of drills and pins permitting utilization of the jig to drill stair rail holes to accept a variety of spindle sizes.

Still another object of the invention is to provide a stair rail drilling jig as described which can easily be set up and used by relatively inexperienced workers.

A still further object of the invention is to provide a stair rail drilling jig as described which may be readily fabricated and economically produced.

BRIEF DESCRIPTION OF THE DRAWINGS

FIG. 4 is a view similar to FIG. 3 with the demountable base plate portion in place and an aligning pin therein engaged with a previously drilled hole;

FIG. 5 is a reverse side view of one of the blocks of the drilling jig showing the manner in which the drill guide member thereof is locked in position;

DESCRIPTION OF THE PREFERRED EMBODIMENT

Figure 1:
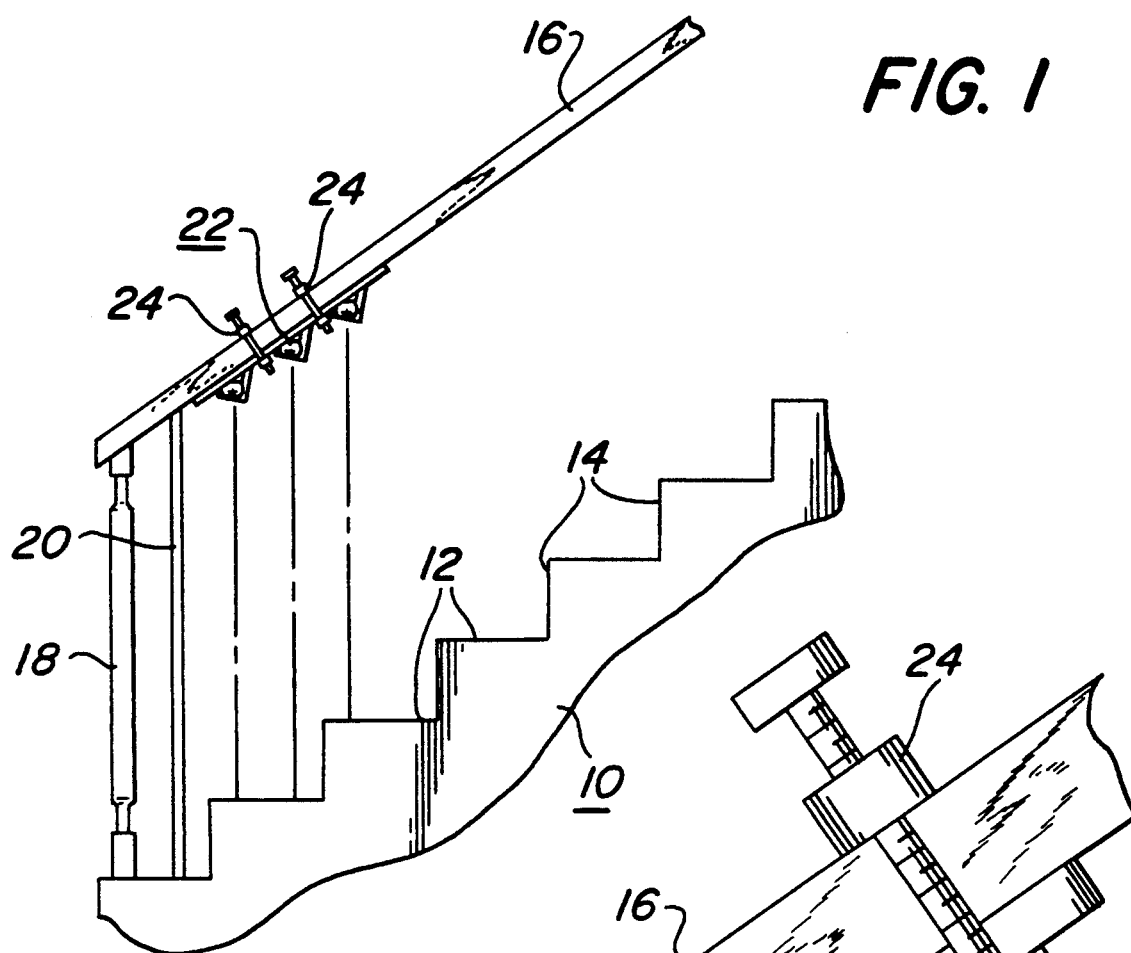
FIG. 1 is a partial side elevational view of a stair case with the stair rail in position over the stairs and with a drilling jig in accordance with the present invention being clamped thereto for drilling of the holes for the spindle upper ends.

Referring to the drawings, and particularly FIG. 1 thereof, a staircase generally designated 10 includes a plurality of steps 12 and risers 14 above which is disposed a rail or banister 16 supported at its lower end by a knule post 18 on the lowermost step. A plurality of spindles, in this instance, two spindles per step, are to be mounted between the steps 12 and the rail 16, a first spindle 20 being shown in position on the lowermost step adjacent the knule post 18. Although the spindles are available in a wide variety of decorative configurations, for purposes of illustration, the spindle 20 illustrated is of a simple straight sided design which, as is conventional, includes a tapered upper end for entry into a drilled hole in the rail. Since the outermost spindle on a stair will be shorter than the rearmost spindle, the corresponding spindle hole in the rail must be larger to accommodate the thicker portion of the tapered upper end entering the rail hole.

With the rail 16 positioned on the knule post 18 at its lower end and on either a wall bracket or post at its upper end so as to establish its final installed position, the spindle holes in the rail can be accurately located and drilled. For this purpose, the present rail drilling jig generally designated 22 illustrated in FIG. 1 is in its operative position clamped to the underside of the rail 16 by a pair of clamps 24.

Figure 2:
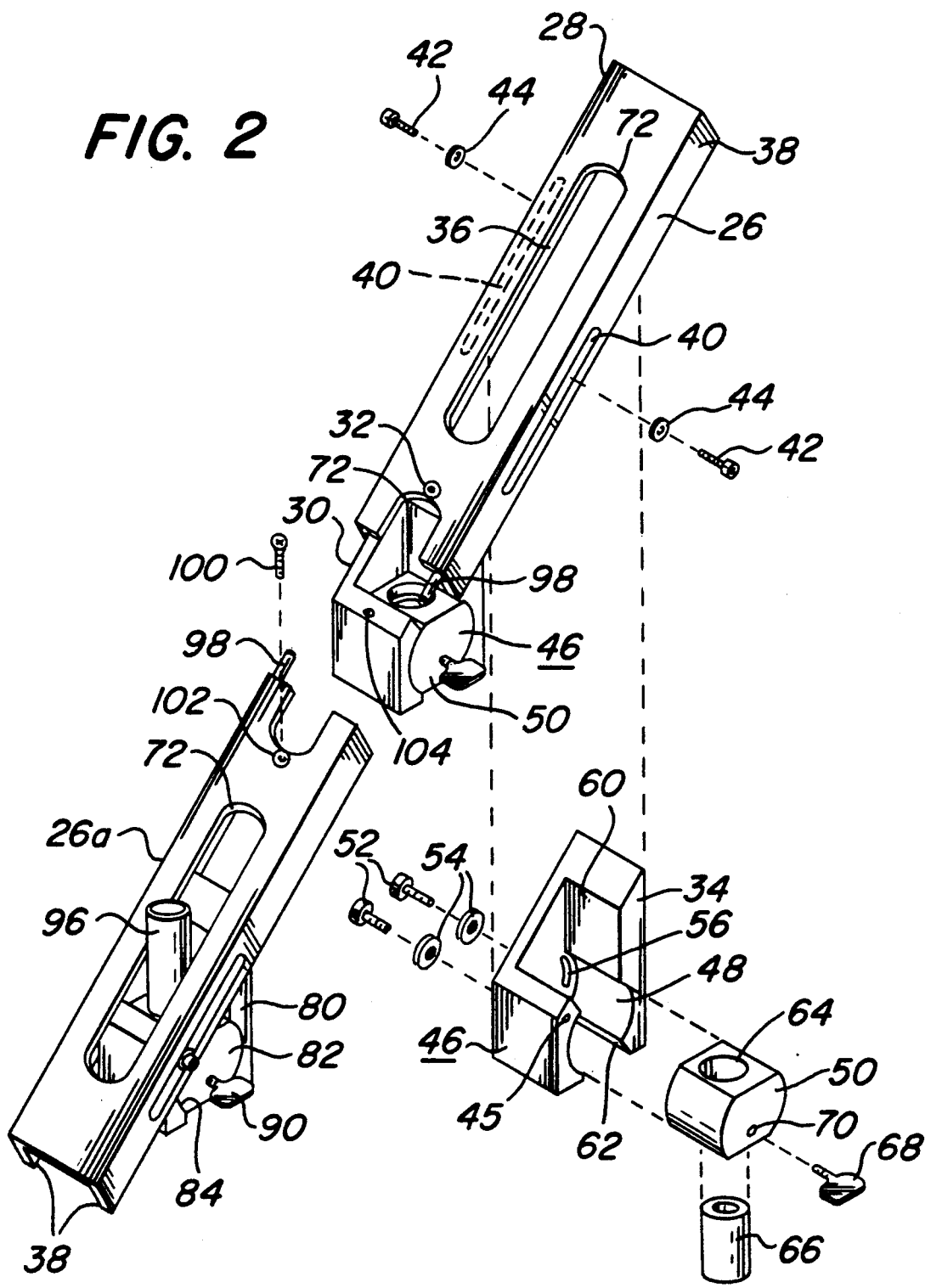
FIG. 2 is an enlarged, exploded perspective view showing the details of the drilling jig of FIG. 1.

The details of the jig 22 are most readily understood by reference to FIG. 2. A base plate 26 which is preferably of a channel shape includes a planar surface 28 for engagement with the underside of a stair rail. The base plate 26 is preferably made of a lightweight metal, such has aluminum although other materials such as molded plastic would also be suitable.

A first block 30 is fixedly secured at one end of the base plate 26 by countersunk screw 32 extending through the surface 28. A second block 34 is adjustably mounted on the base plate 26 for selective spacing with respect to the first block 30. The second block 34 as well as the first block 30 are dimensioned to fit within the slot provided by the channel 36 of the base plate defined by the sidewalls or flanges 38 thereof. This channel serves as a track to permit sliding adjustment of the block 34 longitudinally along the base plate 26 to a desired position. Slots 40 in the base plate flanges 38 provide in conjunction with screws 42, washers 44 and the threaded holes 45 in the block 34, locking means to secure the block 34 in the desired position.

The blocks 30 and 34 each include drill guide means therein which are angularly adjustable to accommodate the angle of inclination of the stair rail. Since the drill guide means are identical in each of the blocks 30 and 34, the same identifying numerals will be used with respect to each block drill guide means.

The drill guide means, generally designated 46, includes a cylindrical cavity 48 in each block within which a cylindrical drill guide member 50 is adjustably disposed. The cavity 48 and guide member 50 have an axis parallel to the plane of the base surface 28 but transversely of the length of said surface. The drill guide members 50 are adjustably secured within the blocks 30 and 34 by means of lock screws 52 and washers 54 which pass through a pair of arcuate slots 56 in the blocks and are threadedly engaged with holes 58 in the guide members 50 (see FIG. 5).

The blocks 30 and 34 include slots 60 and 62 intersecting the cavity 48 to permit passage of a drill through the drill guide members 50. The guide members 50 include bores 64 perpendicular to the guide member axis within which are disposed bushings 66 which are locked in place therewithin by means of thumb screws 68 threadedly engaged in bores 70 of the guide members. Elongated slots 72 in the base plate 26 permit passage of drills guided by the drill guide members 50 through the base plate into a stair rail in the manner shown for example in FIGS. 3 and 4.

Figure 3:
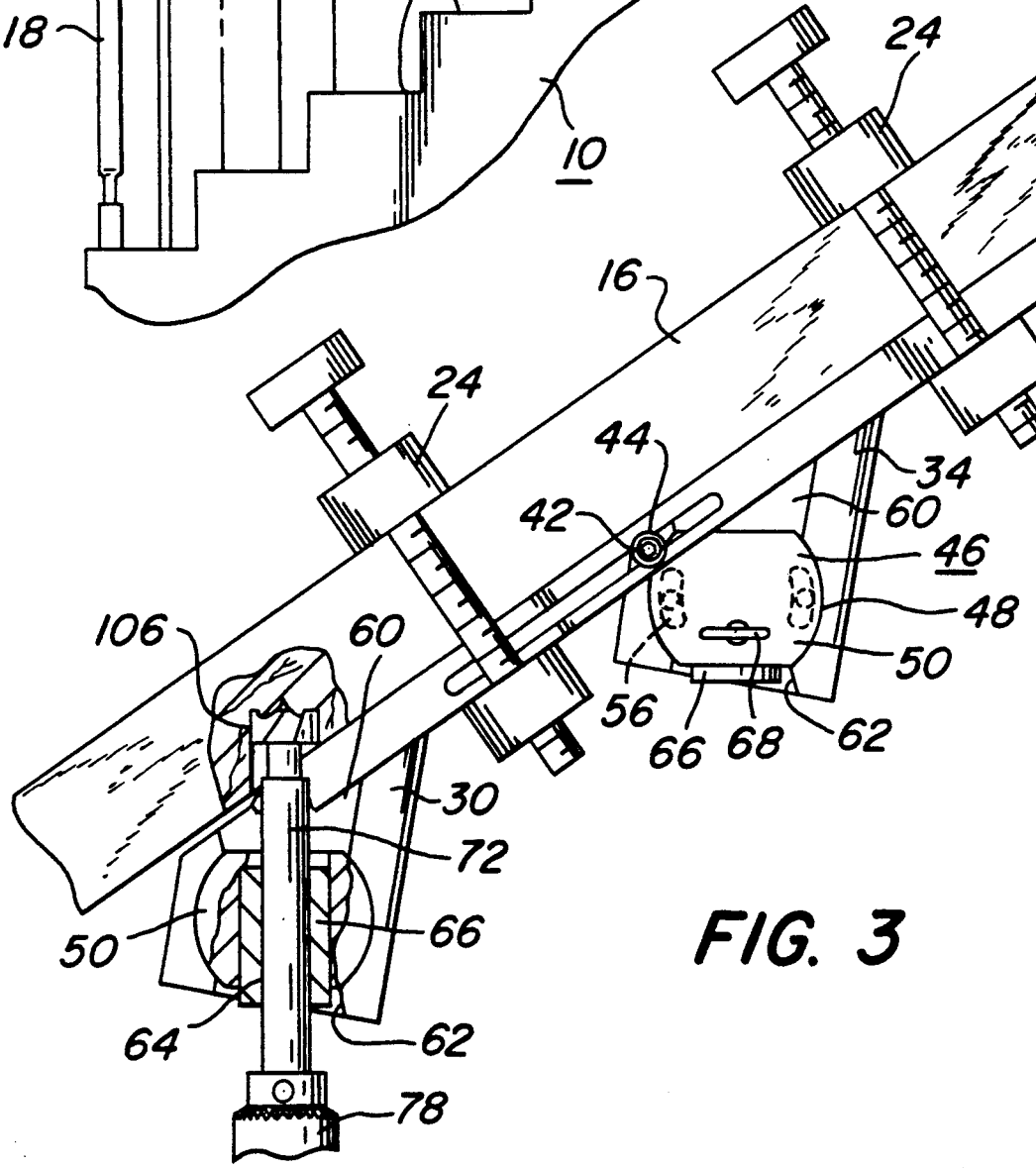
FIG. 3 is an enlarged side elevational view partly in section showing the jig of FIGS. 1 and 2 with the demountable base plate portion removed and with a drilling bit in use therewith.
Figure 7:
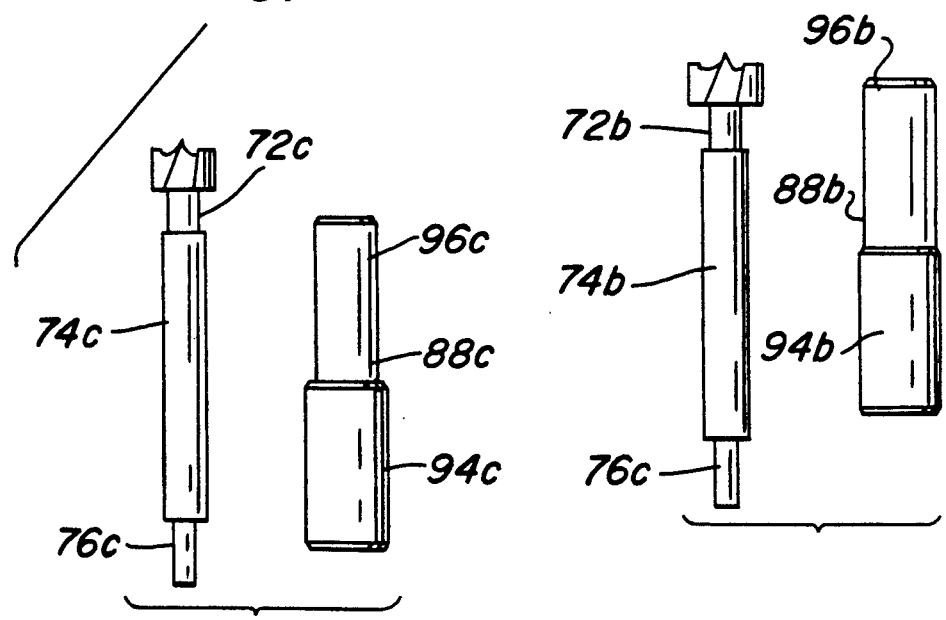
FIG. 7 is a view showing three matched sets of drills and aligning pins exemplary of a kit incorporating the drilling jig of FIGS. 1–6.

Although the jig could be used with auger bits or twist drills by employing bushings in the drill guide members having appropriate internal diameters, in the preferred form of the invention, the drill bits are of the Forstner type and are modified to provide an elongated shank portion suitable for cooperative engagement with the bushings 66. As shown in FIG. 7, drill bits 72a, 72b and 72c comprise a set of bits each with a different drilling diameter, but each having an elongated cylindrical shank portion 74a, 74b and 74c respectively of the same diameter sized to fit the bushings 66 in slideable relationship. The drill bit ends 76a, 76b and 76c are of reduced diameter of a size suitable for attachment to an electric drill chuck 78 as shown in FIG. 3.

Figure 6:
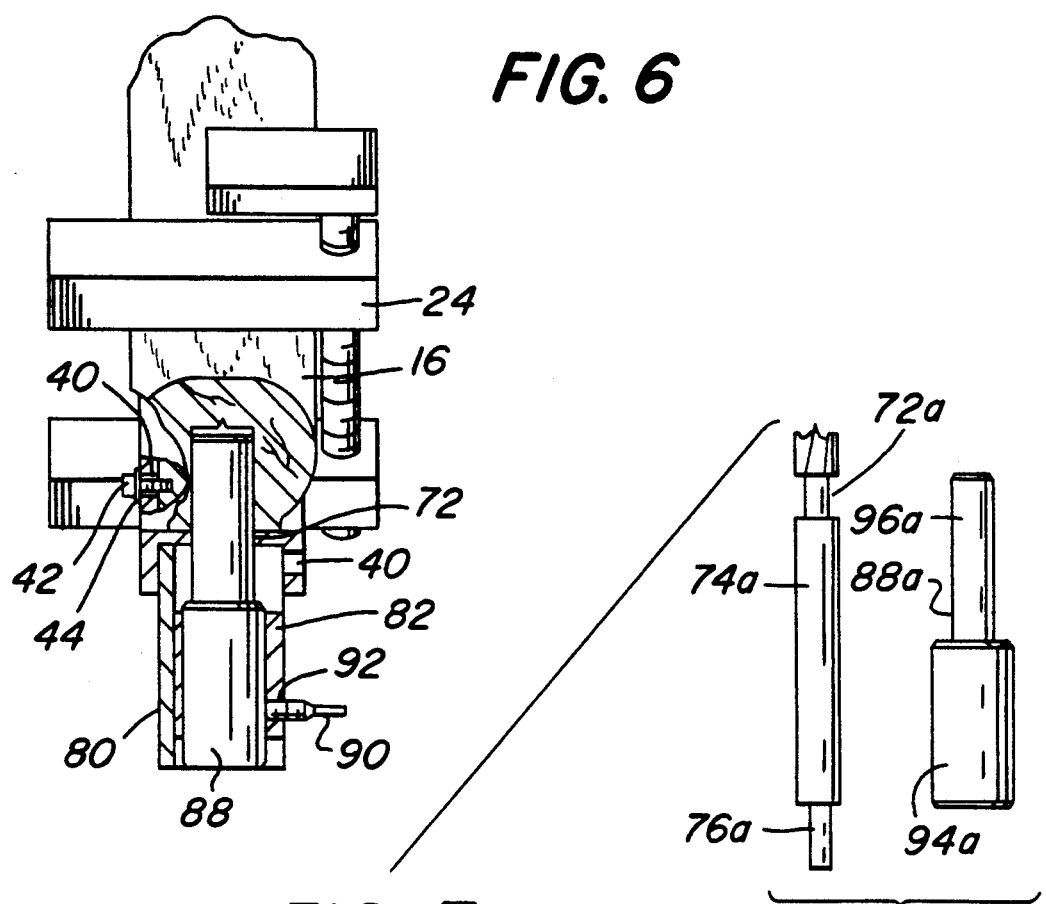
FIG. 6 is a view partly in section taken along line 6—6 of FIG. 4.

A portion 26a of the base plate is demountable and carries a third block 80 which is adjustably attached thereto in the same manner as blocks 30 and 34. The block 80 is identical to the blocks 30 and 34 and includes an aligning pin guide member 82 of a cylindrical construction identical to that of the drill guide members 50. The guide member 82 is disposed within a cylindrical cavity 84 of the block 80, the axis of which is parallel to the plane of the base surface 28 but extends transversely to the length of said surface. As shown in FIG. 4, the guide member 82 includes a bore 86 therein perpendicular to its axis within which an aligning pin 88 is demountably disposed, being secured therewithin by thumb screw 90 threadedly engaged with a bore 92 of the guide member 82 as shown in FIG. 6.

The aligning pin 88 includes a shank portion 94 adapted to slideably fit within the bore 86 of the guide member 82, and a tip portion 96 of a diameter substantially equal to that of one of the holes drilled into the stair rail.

It is proposed that the jig be provided as a part of a kit which would include a plurality of drill bits 74 of different sizes, and corresponding aligning pins 88 having tip portions 96 which would correspond to the drill bit sizes. The shank portions 94 of the aligning pins would all be of the same size in order to fit interchangeably within the bore 86 of the aligning pin guide member 82. In FIG. 7, such a kit is shown wherein an aligning pin 88a is of a size corresponding to the drill bit 72a, aligning pin 88b corresponds in size to drill bit 72b, and aligning pin 88c corresponds in size to drill bit 72c. Although three sets of drill bits and corresponding aligning pins are illustrated, a typical kit might include half a dozen sizes or more since spindles are made in a wide range of upper end diameter.

The detachable portion 26a of the base plate is connected to the main portion thereof by means of a pair of aligning pins 98, one of each of which is secured to one of the base plate portions for sliding entry into corresponding aligned bores in the opposite portion. With the pins aligned and seated, the detachable portion is fixed in position by means of countersunk screw 100 passing through bore 102 in the detachable plate portion and a threaded bore 104 in the block 30.

For use of the jig, as shown in FIG. 3 with the demountable section 26a of the base plate removed, clamps 24 are utilized to clamp the base plate surface 28 against the underside of the rail 16. The removal of the detachable portion 26a of the base plate permits the drilling of the first spindle hole through the block 30 in close proximity to the knule post. By locating the position of the lower end of the first spindle 20 on the step and using a plumb line or level to locate the position of the spindle hole in the rail, the jig 22 is clamped to the rail with the drill guide member 50 of the block 30 aligned with the intended spindle hole. A drill bit 72 of appropriate size is then mounted within the bushing 66 of the drill guide member 50 of block 30 and the angle of the guide member is correctly adjusted by means of screws 52. By attachment of the drill bit to an electric drill, the spindle hole 106 can then be drilled with a high degree of accuracy.

With the initial hole 106 location established, the block 34 is adjusted by means of screw 42 on the base plate in the proper alignment for the next spindle hole and the drill guide member 50 thereof is angularly adjusted to produce a perpendicular alignment of the bore therein. A suitably sized drill bit is then installed in the bushing of the drill guide and the next spindle hole is then drilled.

Following the drilling of the first two holes, the jig is removed from the rail and the demountable base plate portion 26a is reattached by means of the pins 98 and screw 100. With an aligning pin 88 of an appropriate size to match the last drilled hole 107 mounted in the pin guide member 82, and the angle of the pin guide member adjusted to align with that of the drill guides of the blocks 30 and 34, the jig is again clamped to the rail as shown in FIG. 4 with the aligning pin 88 thereof inserted in the last drilled hole 107. The next two holes can then be drilled, and in FIG. 4, the next hole 108 is shown with the drilling in progress.

Successive sets of holes are drilled in the same manner, the jig being moved up the rail and reclamped for the drilling of each pair of holes with the aligning pin always being inserted in the last drilled hole before the jig is again clamped to the rail.

As will be noted in FIG. 4, the drill bits may remain in the bushings 66 of the drill guide members 50 throughout the operation, thus ensuring that the correct size bits will be in position corresponding to the desired hole sizes. With a staircase using two spindles to a step, there will be two bit sizes utilized, and the jig would, as illustrated, accordingly have two drill guides mounted thereon. For utilization of the jig for a staircase employing three or four rails to the step, additional adjustable blocks with drill guides could be mounted on an extended base plate in the same manner as that employed for block 34.

From the foregoing it can be understood that the present jig permits a fast and accurate drilling of stair rail spindle holes, virtually eliminating the possibility of an incorrect spacing or drill angle of the holes in the rail. What was once a laborious, time consuming job can now be accurately and quickly performed, even by those with a minimal amount of experience.

Manifestly, changes in details of construction can be effected by those skilled in the art without departing from the invention.

I claim:

1. A drilling jig for stair rails comprising:
   a longitudinally extending base plate having a planar base surface for engagement with the underside of a stair rail,
   a first mounting block fixedly mounted to said base plate,
   a second mounting block adjustably mounted on said base plate,
   track means on said base plate along which said second mounting block may be slideably adjusted,
   means for securing said second block in a desired position on said base plate,
   angularly adjustable drill guide means on each of said blocks,
   said base plate including a demountable portion, and an aligning pin guide means adjustably mounted on said demountable pin guide means adjustably mounted on said demountable base plate portion for demountably holding an aligning pin.

2. The invention as claimed in claim 1, wherein said aligning pin guide means includes means for angular adjustment of an aligning pin held thereby.

3. A drilling jig for stair rails comprising;
   a longitudinally extending base plate having a planar base surface for engagement with the underside of a stair rail,
   a first mounting block fixedly mounted to said base plate adjacent one end thereof;
   a second mounting block on said base plate adjustable longitudinally with respect to said first mounting block,
   track means on said base plate along which said second mounting block may be longitudinally slideably adjusted,
   means for securing said second block in a desired position on said base plate;
   said first and second mounting blocks including drill guide means, each said drill guide means being angularly adjustable with respect to said planar base surface, a demountable extension of said base plate extending from the base plate end on which is mounted said first block, a third block mounted on said base plate extension, said third block including aligning pin guide means for demountable adjustable attachment of an aligning pin thereto, said base surface having apertures therein for passage of drills therethrough guided by said drill guide means, and for passage of an aligning pin therethrough held by said aligning pin guide means.

4. The invention as claimed in claim 3, wherein said first and second blocks include cylindrical cavities therewithin, and wherein said drill guide means each include a cylindrical drill guide member for rotatable mounting in said block cavity.

5. The invention as claimed in claim 4, wherein the axis of said block cavities is parallel to said planar base surface and transversely to the length of said surface.

6. A kit of tools for drilling stair rail spindle holes of different diameters, said kit comprising;

a drilling jig having a plurality of drill guides thereon, each said drill guide having a drill bushing of the same diameter, and a plurality of drill bits of different diameters, each said drill bit having an extended shank portion of the same diameter, said drill shank diameter slideably fitting in said jig drill bushings.

7. A tool kit for drilling stair rail spindle holes comprising;

a drilling jig having a plurality of drill guide means and an aligning pin guide means mounted thereon, a plurality of drill bits of different sizes, each of said drill bits having a cylindrical shank portion of the same diameter sized to slideably fit said jig drill guide means, and a set of aligning pins having tip portions sized to match said drill bits, each of said aligning pins having the same size shank portions sized to fit said aligning pin guide means.

* * * * *